United States Patent Office 3,215,551
Patented Nov. 2, 1965

3,215,551
PROCESS OF USING SHELLAC-COMPOSITIONS
Irving Skeist, Summit, N.J., Rock F. Martel, Stamford, Conn., and Werner R. Kuebler, Ho-Ho-Kus, N.J., assignors to Gillespie-Rogers-Pyatt Co., Inc., New York, N.Y., a corporation of Delaware
No Drawing. Filed Nov. 2, 1962, Ser. No. 235,137
12 Claims. (Cl. 106—236)

This invention relates to coating compositions of shellac and blocked organic isocyanates and certain applications thereof. In particular, this invention refers to coating compositions prepared from shellac and blocked organic isocyanates which are applied to a substrate and then cured by heat.

The reactivity of the isocyanate radical with compounds containing labile hydrogen is known. For example, organic polyisocyanates react with certain polyols to form compositions useful for surface coatings. In the preparation of these compositions a polyol is reacted with the polyisocyanate to give a cross-linked structure.

Shellac is a natural resin having several free hydroxyl groups. Moreover, the shellac molecule has other reactive groups such as the carboxy. Shellac will also form cross-linked structures with itself on continued heating. Therefore, when using shellac, in order to obtain cross-linked products which are suitable for surface coatings it is possible to use monoisocyanates as well as polyisocyanates.

For coating on substrates which later can be heated, for example, in wire coating, it is possible to blend together in the proper proportions solutions of the two active ingredients just before use, apply the mixed composition to the substrate, allow the solvent to dry to a film and then cure the film by heating. However, for ease of operation and convenience it is desirable to have these materials available in one package which requires no mixing or blending at the time of use.

In these chemical reactions, the marked reactivity of the organic isocyanate compounds with the shellac results in certain difficulties with regard to stability. In carrying out reactions with the isocyanates, care must be exercised to prevent undesirable reactions by carefully controlling the various steps such as order of addition, temperature, presence of moisture and the like in order to avoid undesirable side reactions. This invention provides a means for controlling the reactivity of the isocyanate with the shellac so that one-package systems can be used.

In our co-pending application Serial No. 235,138, filed November 2, 1962, stable one-package coating compositions are described in which the reaction of the shellac with the isocyanate has taken place prior to applying the coating composition on the substrate, and also one-package stable coating compositions in which an excess of isocyanate is used and the terminal isocyanate groups of an intermediate prepoylmer are cured after applying the coating composition on the substrate by the action of moisture from the air. Neither of these systems require a heat cure after application.

This invention describes stable one-package coating compositions which are useful for substrates which can be heated. After the film is applied, these compositions have the advantage that a more uniform curing rate and greater product control are possible, since the cure is not dependent upon ambient temperature and humidity conditions.

According to our invention stable one-package coating compositions are prepared from shellac and organic isocyanates in which the reactive isocyanate groups are hindered or blocked to render them relatively inactive with the shellac at lower temperatures, but reactive with the shellac at higher temperatures.

The reaction between the isocyanate and the blocking agent is a reversible reaction, the direction of which is controlled by temperature:

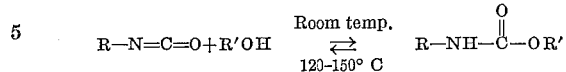

The adduct is formed at relatively low temperatures, while the dissociation into the isocyanate and the blocking agent takes place at relatively high temperatures. The preferred temperature range for formation and dissociation of the organic isocyanate adduct varies with the particular isocyanate and the blocking agent employed. The formation of adducts is also a useful means for controlling the tendency of polyisocyanates to self-polymerize since the inactivation of the isocyanate group will retard such polymerization.

When no blocking agent is used, almost immediately after the addition of the isocyanate, and before the coating composition can be applied to the surface, the isocyanate groups react at room temperature with the shellac molecule, causing premature cross-linking and gelation. However, when the isocyanate adduct is used as the cross-linking agent under otherwise strictly comparable conditions the composition remains in very satisfactory condition and after storage is applied without difficulty to the surface at room temperature by the conventional spraying techniques. A simple heat curing treatment produces on the coated surfaces a uniformly hardened film of outstandingly good properties.

The blocking agents which are useful for preparing stable shellac-isocyanate coating compositions include certain alcohols, cyclic alcohols, phenols, mercaptans, lactams, imides, imines and compounds containing methylene hydrogen. Among the compounds which may be employed are acetoacetic ester, dimethyl malonate, 2-mercaptobenzothiazole, succinimide, phthalimide, naphthalimide, glutarimide, tertiary amyl alcohol, dimethyl phenyl carbinol, tertiary butyl phenol, and diphenylamine. The preferred blocking agents are cyclohexanol and phenol.

Dewaxed, decolorized shellac may be considered as representative of "pure" shellac resin, and is used in the examples unless otherwise indicated. Other types of shellac may be employed. Natural shellac contains wax, red coloring matter and moisture. Generally, when the natural resin is used the solution of the shellac in the solvent can be decanted off from the wax which settles out. Orange shellac is unbleached shellac which may be in the form of flakes, sheets, buttons and the like. It may be employed in any formulations where the color is unobjectionable.

A wide variety of organic isocyanates may be employed, ranging from simple monoisocyanate compounds up to polymeric materials containing isocyanate groups. Examples of isocyanate compounds include the monoisocyanates, such as the alkyl isocyanates; ethyl isocyanate, butyl isocyanate and octadecyl isocyanate; the aryl monisocyanates, such as phenyl isocyanate, α-naphthyl isocyanate, and the like; the diisocyanates, such as the polymethylene diisocyanates, for example ethylene diisocyanate, trimethylene diisocyanate, 2-chlorotrimethylene dissocyanate, tetramethylene diisocyanate, pentamethylene diisocyanate, and hexamethylene diisocyanate; alkylene diisocyanates, for instance propylene-1,2-diisocyanate, butylene-1,2-diisocyanate and butylene-1,3-diisocyanate; alkylidene diisocyanates, such as ethylidene diisocyanate and heptylidene diisocyanate, cycloalkylene diisocyanates, for example, cyclopentylene-1,3-diisocyanate, cyclohexylene-1,4-diisocyanate and cyclohexylene-1,2-diisocyanate; cycloalkane diisocyanates, for instance cyclohexane-1,4-diisocyanate; and 1,8-diisocyano-p-menthane, dicyclohexylmethane diisocyanate; aromatic diisocyanates, for instance methylene bis(p-phenylene isocyanate) which is known as "MDI" and polymethylene polyphenylisocyanate ("PAPI"); p-phenylene diisocyanate, 1-methylphenylene-2,4-diisocyanate, naphthylene-1,4-diisocyanate, 2,6-toluene diisocyanate, 2,4-toluene diisocyanate, xylene-1,3-diisocyanate, 4,4'-diphenylene methane diisocyanate, 4,4'-diphenyllenepropane diisocyanate, benzidine diisocyanate, tolidine diisocyanate, and the like; corresponding tri, tetra, etc. isocyanates, such as 1,2,4-benzene triisocyanate, triphenylmethane triisocyanate, diphenylmethane tetraisocyanate, and the like. The aromatic nucleus of an aryl isocyanate is preferably the benzene ring. The aromatic ring may be substituted with groups which are non-reactive with isocyanate groups, such as alkyl or halogen. For simplicity, the term "isocyanate" is used throughout this specification to mean organic isocyanates.

The toluene diisocyanate referred to in the discussion and in the examples is an 80/20 mixture of 2,4-toluene diisocyanate and 2,6-toluene diisocyanate. This mixture is generally the preferred reactant because of its low cost. The 2,4-isomer may be used if lower viscosity materials are desired. The 80/20 isomeric mixture is the product naturally resulting from the dinitrating of toluene, reducing this product to the diamine, and then treating it with phosgene.

Superior coatings utilizing shellac as a basic material are prepared by incorporating other reactive organic materials. For example, polyols with less functionality than shellac may be added to increase flexibility and toughness, or to impart other special properties, such as gloss or adhesion. Addition agents which have been found to be particularly useful for this purpose are the polyoxyalkylene condensate polyols which are commercially available from the reaction of a variety of polyols with alkylene oxides, especially propylene oxide and ethylene oxide. Typical of these base chemicals are the diols, diethylene glycol, propylene glycols; triols such as glycerine, trimethylolpropane and hexanetriol-1,2,6, as well as polyols such as sorbitol, pentaerythritol, methyl glucoside, sucrose and tetra(hydroxypropyl)ethylenediamine.

Polyether-polyols are known under various trade names such as Pluracol, Pluronic and NIAX. In the examples "Pluracol TP-440" is a 400 molecular weight product which is made by the addition of propylene oxide to trimethylolpropane; "Pluronic L-61" is a diol of equivalent weight 1000 having terminal primary hydroxyl groups, which contains the sequence polyethylene oxide-polypropylene oxide-polyethylene oxide; NIAX 2025 is a polypropylene diol of the above described type. Polyester-polyols are also useful as addition agents for the compositions of this invention. Polyols of moderately high molecular weight are made by the reaction of low molecular weight polyols, in excess of stoichiometric amounts, with dibasic acids. A typical polyester-diol of this type is prepared by esterifying adipic acid with a slight excess of ethylene glycol.

The particular polyol used in a given formulation may be varied to suit a special use. Combinations of polyols may be employed. Thus a wide selection and combination of properties may be obtained by the addition of comparatively low cost polyols in the shellac-isocyanate coatings. The outstanding properties of these coatings are a combination of hardness and flexibility, abrasion resistance, and good water and chemical resistance. Excellent weather resistance is found in many of the coatings.

It is an advantage that the polyol can serve also, wholly or in part, as a solvent for the shellac, making unnecessary the addition of other shellac solvents, such as methyl ethyl ketone. Thus polyols can be used to afford a solvent-free system which can be used for castings as well as coatings. Systems pigmented for example, with titanium oxide, red iron oxide, ferrite yellow, and the like may be prepared by ball milling the pigment with the polyol. Compositions containing color may also be prepared by dissolving a soluble dyestuff, previously dried to remove moisture, in the solvent which is used for dissolving the shellac.

The first step in the preparation of the coatings of our invention is to prepare an anhydrous solution of shellac in a solvent which is inert to shellac and to organic isocyanates. Any inert solvent, or mixture of solvents, may be used that will afford clear solutions of shellac which can be made anhydrous, which will have physical characteristics suitable for coatings, especially with regard to viscosity, and which are sufficiently stable that the shellac will not reprecipitate on standing at room temperature. The preferred solvents for our invention are methyl ethyl ketone, cyclohexanone, and mixtures of the two. Dioxane can also be employed.

Shellac dissolves in hot methyl ethyl ketone, but as some concentrations the shellac tends to reprecipitate on standing at room temperature. Cyclohexanone dissolves shellac at 90° C., giving crystal clear shellac solutions which remains stable on cooling. The addition of only about 5 parts of cyclohexanone to about 95 parts of methyl ethyl ketone results in a stable shellac solution and this is a preferred solvent mixture for shellac-isocyanate coatings. Other mixtures of cyclohexanone and methyl ethyl ketone can also be used.

Any instability of shellac in methyl ethyl ketone can also be overcome by the incorporation of certain polyols. Although 30 parts of shellac is soluble in 70 parts of Pluracol TP-440 (a 400 molecular weight product made by the addition of propylene oxide to trimethylolpropane) to give a stable solution, the use of lesser amounts of Pluracol produces a more viscous solution which, although clear, requires high temperatures for fluidity. It is important that the shellac solution be made anhydrous due to the reaction of water with isocyanates. The amount of water in a shellac solution can be reduced to less than about 0.02% by having present another liquid as a carrier for the water vapor, which liquid will not boil at too high a temperature, so that on distillation the shellac will not lose plasticity through a heat activated reaction. The preferred liquids are those which form lower boiling azeotropes with water, such as benzene, toluene, xylene, ethylbenzene, and aliphatic hydrocarbons from $C_5$ to $C_{10}$. Using toluene, for example, the shellac is dissolved in a solvent such as methyl ethyl ketone (or a mixture of methyl ethyl ketone and cyclohexanone), toluene is added, and the mixture is then distilled, the water being carried off with the first distillate in the form of a toluene-water azeotrope.

The adduct of the organic isocyanate with a blocking agent is prepared by mixing the two ingredients at a temperature below the decomposition temperature of the desired adduct, and preferably at a temperature within the range of approximately 20° to 35° C. In most instances the reaction will proceed satisfactorily at room temperature. Since the reaction is exothermic it may be necessary to apply cooling to maintain a controlled lower temperature. The time required for the adduct to form will vary from a few minutes to several hours depending upon the particular reactants used. Usually a slight excess of the isocyanate is preferred. A solvent such as toluene, methyl ethyl ketone or o-dichlorobenzene which is inert to both the shellac and the isocyanate may be employed.

The shellac solution is then mixed with the isocyanate adduct in approximately equal stoichiometric proportions of the isocyanate to the shellac hydroxyl. A stable coating composition results. The coating is applied to a substrate in the usual manner by brush, spray or dip methods. The solvent is permitted to evaporate and the film which forms is cured by heating, for example, in an oven. The temperature of the cure will vary with the particular isocyanate adduct employed, but is generally in the range of 80° to 250° C.

The following are examples that serve to illustrate but do not limit my invention. In the following examples the hydroxyl equivalent of shellac has been taken as 225, but it must be understood that shellac, being a natural product, may have a greater or lesser hydroxyl equivalent weight depending on its origin or its processing history.

*Example 1*

|  | phs.[1] | Equivalents |
|---|---|---|
| Shellac, 4 grams | 61.5 | 0.0178 |
| Methyl ethyl ketone, 10.0 ml | | |
| Toluene diisocyanate, 2.5 gram | 38.4 | 0.0288 |
| Cyclohexanol, 5.75 gram | | 0.0575 |

[1] Parts per hundred solids.

The shellac is dissolved in dry methyl ethyl ketone by heating at about 65° C. A cyclohexanol-toluene diisocyanate adduct is prepared by mixing the toluene diisocyanate with cyclohexanol while cooling so as to keep the temperature below 32° C. The two compositions are mixed and stirred. The final composition is then applied to wood and the coating is cured by heating in an oven at about 120° C. The coating has good water resistance.

In accordance with the above procedure, but using an equivalent weight of polymethylene polyphenylisocyanate (PAPI) or an equivalent weight of methylene bis(p-phenylene isocyanate), (MDI), in place of the toluene diisocyanate, a coating composition is obtained which cures on heating to form coatings having greatly improved water resistance.

*Example 2*

Two moles of phenol are added to one mole of toluene diisocyanate and the product is heated to about 80° C. for about 5 minutes. A solution of shellac in methyl ethyl ketone is then added in a 1/1 ratio of shellac to the toluene diisocyanate/phenol. The mixture is stirred at room temperature and then coated on a glass slide. The coating is cured by heating for 5 minutes at 150° C. It has excellent water resistance.

In accordance with the above procedure, but using an equivalent amount of acetoacetic ester, or diethyl malonate, in place of phenol a stable coating composition is obtained which cures on heating to form coatings having improved water resistance.

While certain representative embodiments and details have been shown for the purpose of illustrating the invention, it will be apparent to those skilled in the art that various changes and modifications may be made therein without departing from the spirit or scope of the invention.

We claim:
1. A process of coating a surface which comprises applying to said surface a coating composition, which is stable at ambient temperatures, comprising shellac, a blocked organic isocyanate and an inert anhydrous organic solvent; exposing the resulting coating surface to the air to permit the solvent to evaporate and a coating film to form on said surface; and then curing said coating film by heat.

2. A process of coating a surface which comprises applying to said surface a coating composition which is stable at ambient temperatures consisting essentially of a solution of approximately stoichiometric proportions of shellac and a blocked isocyanate in an inert anhydrous organic solvent; exposing the resulting coated surface to the air to permit the solvent to evaporate and a coating film to form on said surface; and then curing said coating film by heat.

3. The process of claim 2 wherein said organic isocyanate is blocked with an agent selected from the group consisting of cyclohexanol, phenol, acetoacetic ester and diethyl malonate, and said curing takes place at a temperature of about 120° to 150° C.

4. The process of claim 3 wherein said organic isocyanate is blocked with phenol.

5. The process of claim 3 wherein said organic isocyanate is blocked with cyclohexanol.

6. The process of claim 2 wherein said solvent is selected from the group consisting of dioxane, methyl ethyl ketone, cyclohexanone, and mixtures of methyl ethyl ketone and cyclohexanone.

7. The process of claim 3 wherein said solvent is methyl ethyl ketone.

8. The process of claim 2 wherein said organic isocyanate is an admixture of 2,4-toluenediisocyanate and 2,6-toluenediisocyanate.

9. The process of claim 2 wherein said organic isocyanate is polymethylene polyphenylisocyanate.

10. The process of claim 2 wherein said organic isocyanate is methylene bis(p-phenylene isocyanate).

11. The process of claim 2 wherein said solution of shellac and blocked isocyanate contains a polyalkylene condensate polyol.

12. The process of claim 11 wherein said polyalkylene condensate polyol is derived from an alkylene oxide having from 2 to 3 carbon atoms and a diol having from 2 to 3 carbon atoms.

References Cited by the Examiner

UNITED STATES PATENTS

| 2,041,733 | 5/36 | Werntz | 106—37 |
| 2,409,712 | 10/46 | Schweitzer | 260—453 |
| 2,853,397 | 9/58 | Seibert et al. | 106—237 |
| 3,061,557 | 10/62 | Hostettler et al. | 260—2.5 |
| 3,084,182 | 4/63 | McElroy | 260—482 |
| 3,108,084 | 10/63 | Whitehill | 260—22 |

OTHER REFERENCES

"Paint, Oil and Chemical Reviews," volume 116, No. 26, 1953 (pages 28 and 29 relied upon).

ROBERT F. WHITE, *Primary Examiner.*

MORRIS LIEBMAN, *Examiner.*